(12) United States Patent
Behera et al.

(10) Patent No.: US 12,511,288 B1
(45) Date of Patent: Dec. 30, 2025

(54) AD HOC QUERY BATCH COMPILATION SERIALIZATION

(71) Applicant: MICROSOFT TECHNOLOGY LICENSING, LLC, Redmond, WA (US)

(72) Inventors: Smita Behera, Yarrow Point, WA (US); Manish Eknath Tawade, Redmond, WA (US); Derek Marcel Wilson, Chester, VA (US); Irving Alfonso Covarrubias Martin Del Campo, Bellevue, WA (US); Shitong Song, Guangzhou (CN); In-Jerng Choe, Sammamish, WA (US); Wai Keat Tan, Seattle, WA (US); Patryk Maciej Uchman, Seattle, WA (US); Adrian Catalin Dragusanu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/964,200

(22) Filed: Nov. 29, 2024

(51) Int. Cl.
*G06F 16/25* (2019.01)
*G06F 16/2453* (2019.01)
*G06F 16/90* (2019.01)
*G06F 16/93* (2019.01)

(52) U.S. Cl.
CPC .. *G06F 16/24539* (2019.01); *G06F 16/24549* (2019.01)

(58) Field of Classification Search
None
See application file for complete search history.

(56) References Cited

U.S. PATENT DOCUMENTS

| | | | |
|---|---|---|---|
| 10,176,222 B2 * | 1/2019 | Schneider | G06F 16/24545 |
| 2008/0172369 A1 * | 7/2008 | Baranczyk | G06F 16/2453 |
| 2016/0371356 A1 * | 12/2016 | Lee | G06F 16/273 |
| 2019/0340284 A1 * | 11/2019 | Kandukuri | G06F 16/24535 |
| 2025/0021554 A1 * | 1/2025 | Chang | G06F 16/24542 |
| 2025/0131006 A1 * | 4/2025 | Ju | G06F 16/221 |

* cited by examiner

*Primary Examiner* — Son T Hoang
(74) *Attorney, Agent, or Firm* — Han Gim; Newport IP, LLC

(57) ABSTRACT

When two ad hoc query batches with the same query text are to be compiled, one locking key is created for both ad hoc query batches. The locking key is allocated to the first ad hoc query batch. In a subsequent cache lookup stage, if no cache is found for the first ad hoc query batch, a plan is compiled for the first ad hoc query batch, and inserted into a cache. The locking key is released and allocated to the second ad hoc query batch. If the locking key for the second ad hoc query batch is the same as for the first ad hoc query batch, the compiled plan is identified in the cache. Plan compilation is bypassed for the second ad hoc query batch.

20 Claims, 5 Drawing Sheets

AD HOC QUERY BATCH COMPILATION SERIALIZATION

BACKGROUND

Query compilation is a process where a database system converts a high-level query into an efficient execution plan to retrieve data. Query optimization and compilation is a multi-phased process for generating a sufficient query execution plan. Query compilation is a compute-intensive process as searching for the optimal plan during compilation can consume significant system resources, such as central processing unit (CPU) time and memory. It is with respect to these and other considerations that the disclosure made herein is presented.

SUMMARY

Structured Query Language (SQL) systems typically implement a caching mechanism for processing query batches. The caching mechanism allows for the retaining optimized plans from executed stored procedures, ad hoc queries, and the like. Cached plans can be re-used until they are deemed invalid (i.e., due to a schema/data change). The caching mechanism eliminates the cost of recompilation for frequently executed queries. When a failover occurs between a primary and backup compute instance in a computing network providing SQL services, the contents of the plan cache are deleted. During the first 5-10 minutes the plan cache is empty at the new instance while plans are compiled and cached. This burst of compilation processing causes the overall central processing unit (CPU) usage to spike, which can lead to overall resource contention and a drop in performance for client users. This phenomenon is referred to as "compile storm". Identical ad hoc query batches are computed in parallel, and hence plan caching does not provide efficiencies in this situation. Thus such parallel processing can further exacerbate compile storms.

In various embodiments, in order to mitigate compile storms, a mechanism is implemented for compiling ad hoc query batches in sequence, or serially. A lock is issued or obtained, and identical query batches are processed in sequential order rather than in parallel. This allows for caching of the plan for the first query batch, which in turn allows later batches to use the cached plan to and save computing resources by avoiding the separate/redundant compilation of the query batch.

In an embodiment, when two ad hoc query batches with the same query text are to be compiled, both query batches will attempt to obtain a lock before compilation. The same locking key is generated for both query batches as the query text is the same. In an example, query batch A and query batch B have the same query text. Query batch A receives the lock, and query batch B waits. In the next cache lookup stage, no cache is found for query batch A. Query batch A is thus compiled and a plan is generated. For query batch A, after compilation, the plan is inserted into the cache, and the lock is released. Query batch B then receives the lock. As the cache key is the same as for query batch A, in the cache lookup stage for query batch B, the cached plan is found. Query batch B is thus able to bypass duplicated plan compilation and jump to the compiled stage. Query batch B releases the lock and moves to the next stage.

The disclosed technologies provide the technical benefits of ensuring that compile storms due to parallel plan compilation of identical query batches in database systems are avoided, thus avoiding spikes in processing resources.

This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, same reference numbers in different figures indicate similar or identical items.

DETAILED DESCRIPTION

Described herein are technologies that allow for improvements in the performance of multi-tenant architectures in SQL databases. Query optimization and compilation is a multi-phased process for generating query execution plans. Query compilation is an expensive process, searching for the optimal plan during compilation consumes significant CPU and memory resources. Structured Query Language (SQL) systems typically implement a caching mechanism for processing query batches. However, such a mechanism is not implemented for ad hoc query batches. Identical ad hoc query batches are computed in parallel, causing parallel processing of plans since the cache plan is not used. This contributes to the problem of compile storms.

To address these and other issues, the present disclosure describes a mechanism that can be implemented in an SQL codebase for compiling ad hoc query batches in sequence. In an embodiment, identical query batches are processed in sequential order rather than parallel. One of a group of matching ad hoc query batches obtains a lock. The ad hoc query batch is processed and a plan is generated. The plan for the first query batch is cached and reused for processing subsequent batches of the group of matching ad hoc query batches. As used herein, the term ad hoc query batch describes a batch that contains one or more of SELECT, INSERT, UPDATE, DELETE, or MERGE statements, and is not pre-prepared.

In an example of the disclosed embodiments, two ad hoc query batches have the same query text and are waiting to be compiled. In an embodiment, both query batches will attempt to obtain a lock before getting compiled. The same locking key is generated for both query batches as the query text is the same. The first ad hoc query batch (query batch A) obtains the lock, and the first ad hoc query batch (query batch B) waits to be compiled.

In the following cache lookup stage, no cache will be found for query batch A and thus compilation is performed to generate a plan for query batch A. After compilation, the generated plan is inserted to cache, and the locking key is released. Query batch B then obtains the locking key. As the locking key is same as the locking key for query batch A, during the cache lookup stage for query batch B, the cached plan (that was created for query batch A) is accessed. Query batch B can skip compiling a duplicated plan and jump to the compiled stage. Query batch B releases the locking key and moves to the next stage.

In an embodiment, an exact text match for two ad-hoc query batches is required before cache reuse is allowed. In some cases, the text match is both case- and space-sensitive. From the plan cache perspective, plans are stored at the query batch level, which avoids recompilation for ad hoc query batches with the same text.

Figure 1:
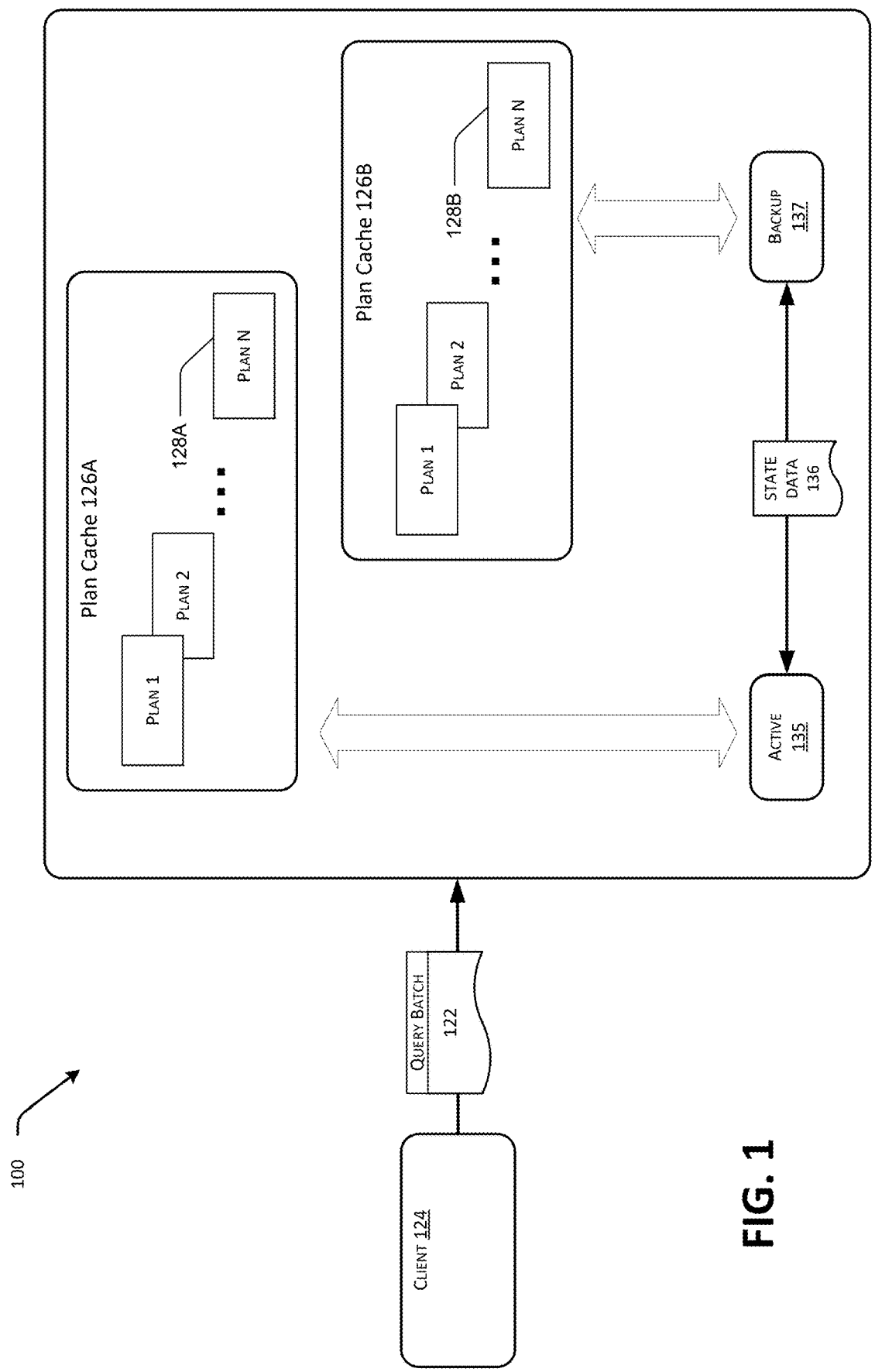
FIG. 1 illustrates an example architecture in accordance with the present disclosure.

Referring to FIG. 1 illustrates an example computing network 100 where high availability (HA) database services are provided in the computing network 120. Computing network 100 comprises a plurality of network devices including database services shown as DB services 134 implemented as at least two instances (135, 137). The two instances comprise an active instance 135 and a backup instance 137. The backup instance 137 may also be referred to as a standby instance. A client or other use 124 may send a query 122 for accessing or modifying data in DB services 134, which are provided, in part, by active instance 135. In the event of maintenance or a failure event, the DB services 134 is switched to the backup instance 137. Backup instance 137 may need to update state data 136 in order to actively provide services. where high availability (HA) database services are provided in the computing network 120. Computing network 100 comprises a plan cache 126A with various plans 128A associated with the active instance 135 that are cached for implemented query batches including query batch 122. Computing network 100 also comprises a plan cache 126B with various plans 128B associated with the backup or secondary instance 137 that are cached for implemented query batches including query batch 122.

Figure 2:
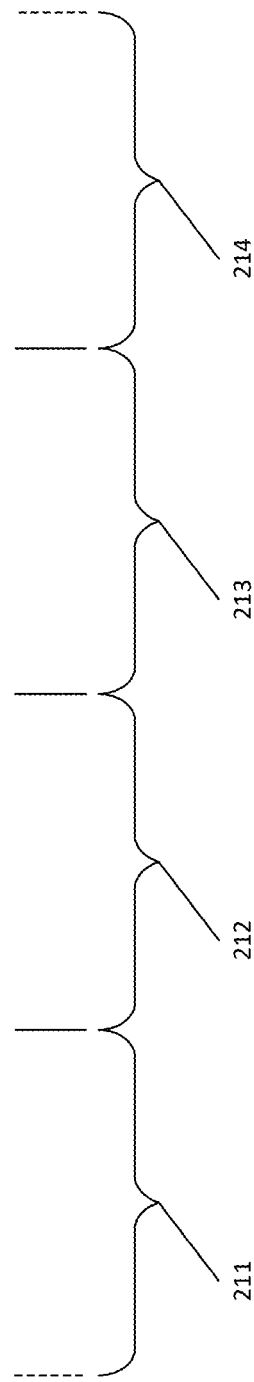
FIG. 2 illustrates an example a query table in accordance with the present disclosure.

Referring to FIG. 2, illustrated is an example of the disclosed embodiments. In the example, batch 2 (202) and batch 3 (203) of the query batches 211 are the same as they consist of queries Q1, Q3, and Q4 as shown in queries 213. Batch 2 (202) and batch 3 (203) are in the same container 212 and are hashed to the same plan handle. According to the disclosed embodiments, one batch of batch 2 (202) and batch 3 (203) will reuse the cached plan from the other batch. For example, if batch 2 is processed first, then the processing can be skipped for compiling the plan for Q1, Q4 and Q3 for batch 3, as the plan that was created for batch 2 can be used from plan cache. Batch 1 (201) and batch 3 (203) are different as batch 1 (201) includes query Q1" and Q2. Even if Q1 in each batch has the same query text, batch 1 and batch 3 will be compiled separately.

In an embodiment, the locking key is generated from a hashing function, which takes the query text as input. This logic ensures a unique match between query text and locking key. In some embodiments, the same locking key is generated when the query batch being executed is from different sessions. In some embodiments, the same query batch being executed with different parameter values will create the same locking key. In some embodiments, the same query being executed with different settings (e.g., ANSI_NULLS ON/OFF) will create the same locking key.

Figure 3:
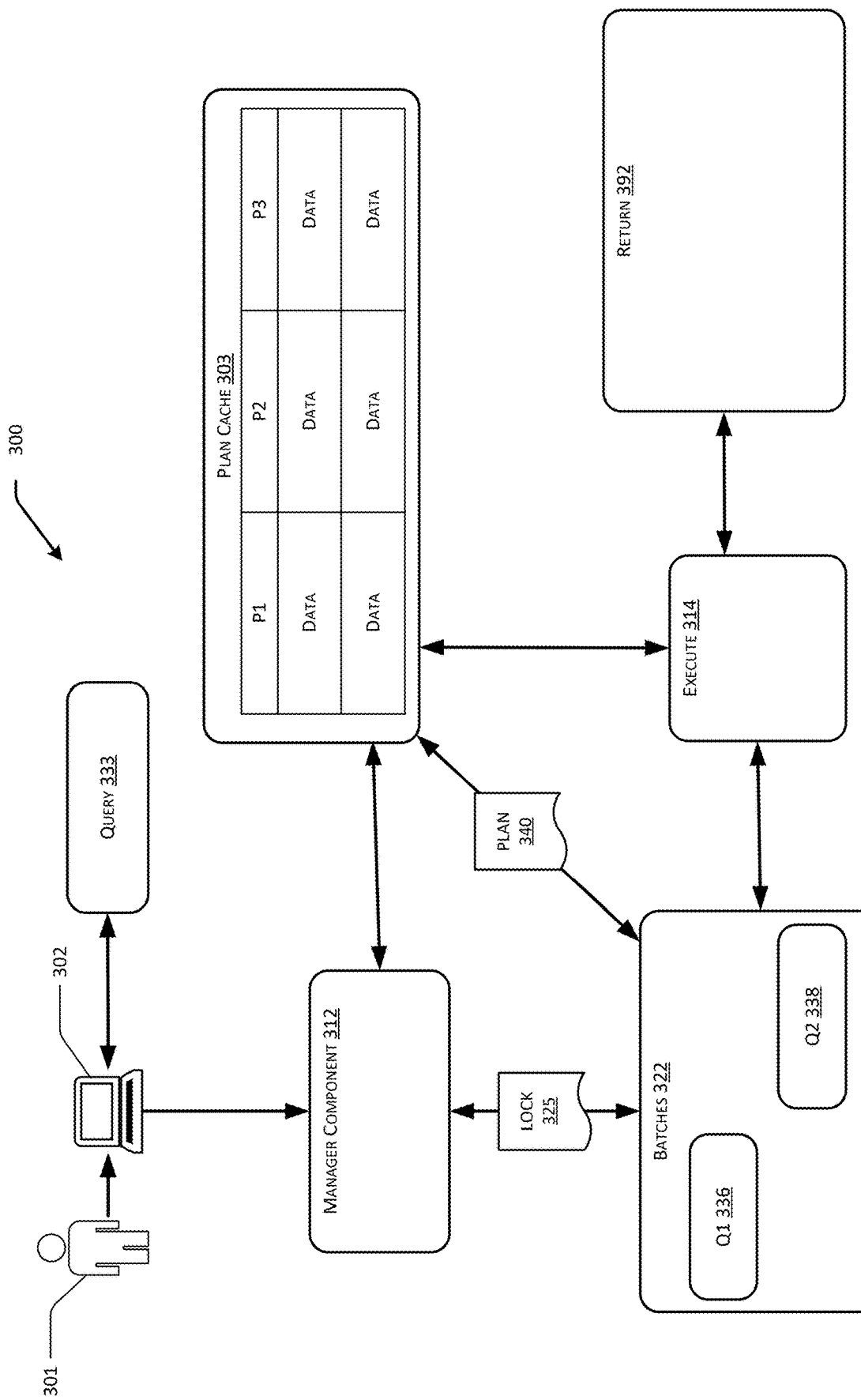
FIG. 3 illustrates an example architecture in accordance with the present disclosure.

FIG. 3 illustrates an example for query compilation in a computing network providing database resources in a computing system 300 providing a multi-tenant database service, in an embodiment. In response to determining that two ad hoc query batches 336, 338 with the same query text are to be compiled, one locking key 325 is generated for both ad hoc query batches 336, 338. The locking key 325 is allocated to the first of the ad hoc query batches 336. In a subsequent cache lookup stage, in response to determining that no cache is found for the first ad hoc query batch 336, a plan 340 is compiled for the first ad hoc query batch 336. The compiled plan 340 is inserted into cache 303 and the locking key 325 is released. The locking key 325 is allocated to the second of the ad hoc query batches 338. It is determined that the locking key 325 for the second hoc query batch 338 is the same as for the first ad hoc query batch 336 and the compiled plan 340 is identified in the cache 303. Plan compilation is bypassed for the second of the ad hoc query batches 338. The compiled plan 340 in the cache 303 is used to process the second of the ad hoc query batches 338. The locking key 325 is released for the second of the ad hoc query batches 338.

Figure 4:
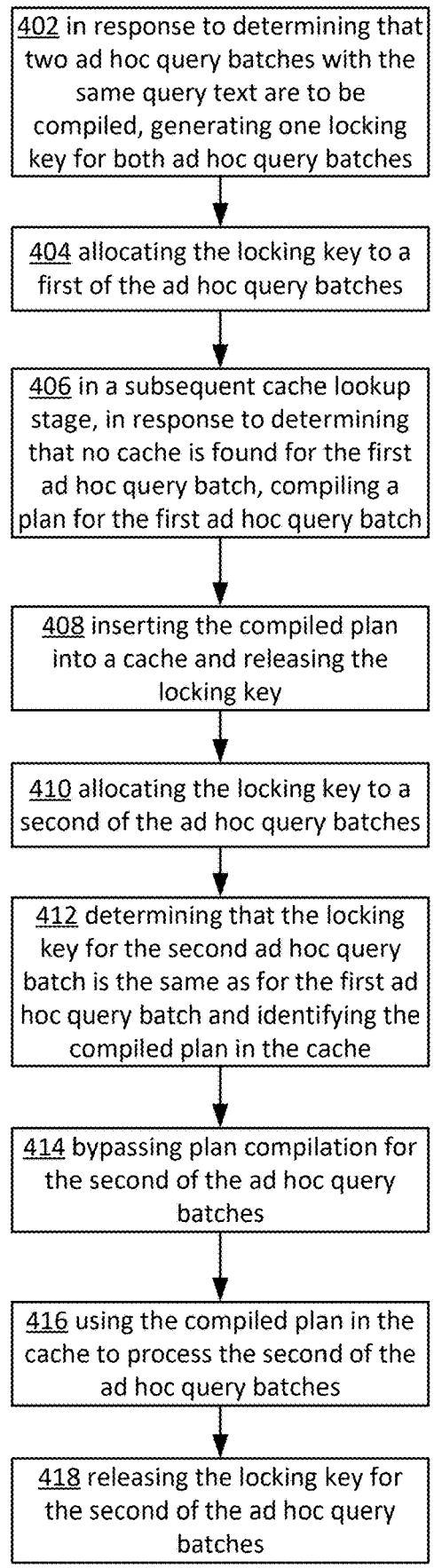
FIG. 4 illustrates an example procedure in accordance with the present disclosure.

Turning now to FIG. 4, illustrated is an example operational procedure for performing query compilation in a computing network providing database resources in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 4, operation 402 illustrates in response to determining that two ad hoc query batches with the same query text are to be compiled, generating one locking key for both ad hoc query batches.

Operation 404 illustrates allocating the locking key to a first of the ad hoc query batches.

Operation 406 illustrates in a subsequent cache lookup stage, in response to determining that no cache is found for the first ad hoc query batch, compiling a plan for the first ad hoc query batch.

Operation 408 illustrates inserting the compiled plan into a cache and releasing the locking key.

Operation 410 illustrates allocating the locking key to a second of the ad hoc query batches.

Operation 412 illustrates determining that the locking key for the second ad hoc query batch is the same as for the first ad hoc query batch and identifying the compiled plan in the cache.

Operation 414 illustrates bypassing plan compilation for the second of the ad hoc query batches.

Operation 416 illustrates using the compiled plan in the cache to process the second of the ad hoc query batches.

Operation 418 illustrates releasing the locking key for the second of the ad hoc query batches.

Figure 5:
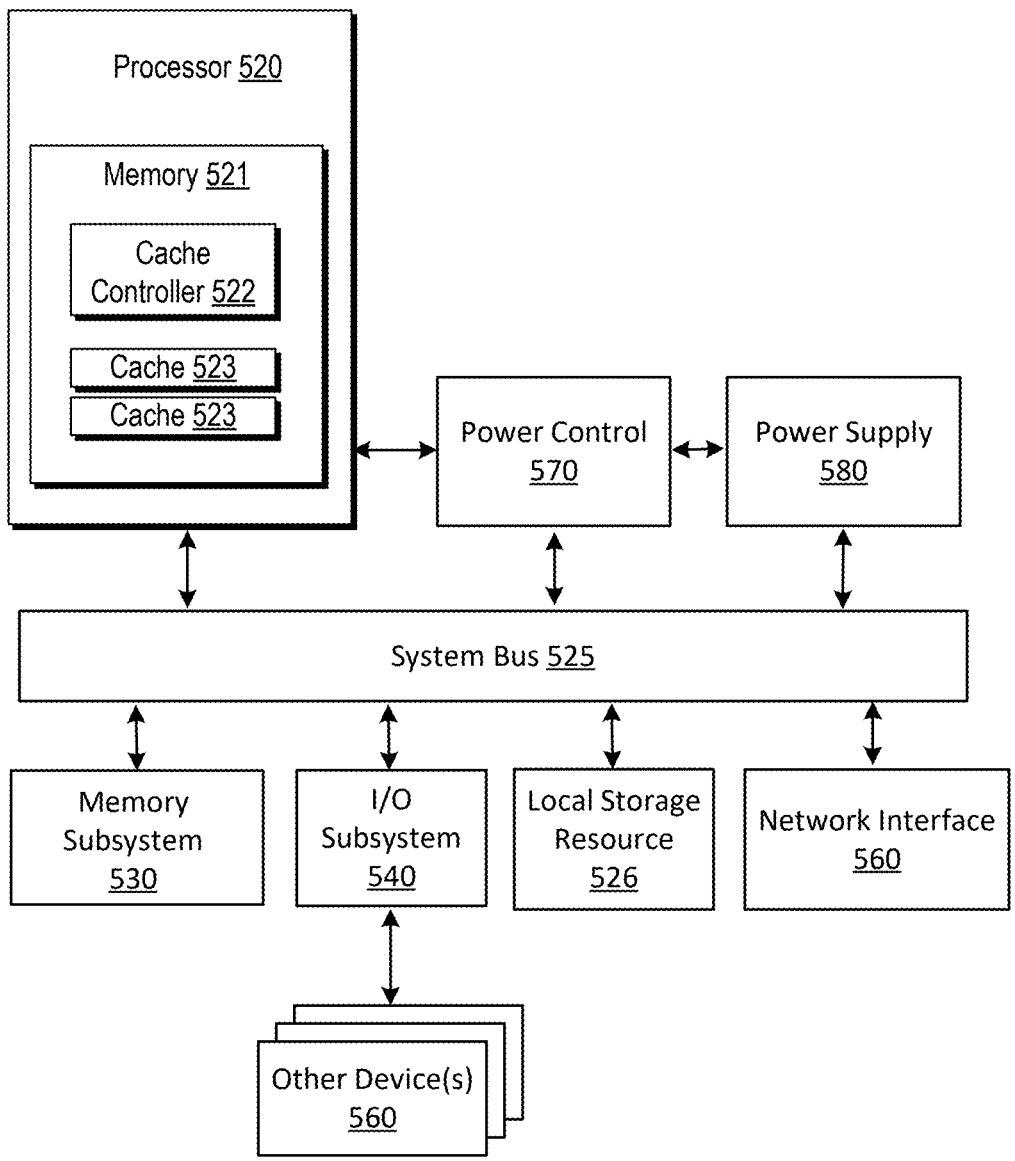
FIG. 5 illustrates an example architecture in accordance with the present disclosure.

FIG. 5 illustrates a block diagram depicting selected elements of an embodiment of a computing environment 500. As described herein, computing environment 500 may represent a computing device such as a personal computer system, a desktop computer, a server, etc. As shown in FIG. 5, components of computing environment 500 may include, but are not limited to, processor subsystem 520, which may comprise one or more processors, and system bus 525 that communicatively couples various system components to processor subsystem 520 including, for example, a memory subsystem 530, an I/O subsystem 540, local storage resource 526, and a network interface 560. System bus 525 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 5, network interface 560 may be a suitable system, apparatus, or device operable to serve as an interface between computing environment 500 and a network (not shown in FIG. 5). Network interface 560 may enable computing environment 500 to communicate over the network using a suitable transmission protocol and/or standard, including, but not limited to, transmission protocols and/or standards. In some embodiments, network interface 560 may be communicatively coupled via the network to a network storage resource (not shown). The network coupled to network interface 560 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 560 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 560 and/or various components associated therewith may be implemented using hardware, software, or any combination thereof.

As depicted in FIG. 5, processor subsystem 520 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 520 may interpret and/or execute program instructions and/or process data stored locally (e.g., in memory subsystem 530). In the same or alternative embodiments, processor subsystem 520 may interpret and/or execute program instructions and/or process data stored remotely (e.g., in a network storage resource, not shown).

As illustrated in FIG. 5, a memory subsystem 521 within processor subsystem 520 may include multiple data caches. A cache controller 522 within memory subsystem 521 may include circuitry to manage the contents of one or more caches 523. For example, cache controller 522 may include circuitry to determine when and if an individual cache line or a group of cache lines should be evicted from one of the caches in accordance with a policy. In at least some embodiments, cache controller 522 may also include circuitry to limit the amount of modified (dirty) cached data that would be flushed to persistent memory upon a system power failure or other power loss event, in response to requests and commands, or other events.

In FIG. 5, memory subsystem 530 may comprise a system, device, or apparatus operable to retain and/or retrieve program instructions and/or data for a period of time (e.g., computer-readable media). Memory subsystem 530 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 500, is powered down. Local storage resource 550 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Each of the processes, methods and algorithms described herein may be embodied in, and fully or partially automated by, code modules executed by one or more computers or computer processors as depicted in FIG. 5. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. For purposes of the claims, the phrase "computer storage medium," "computer-readable storage medium," and variations thereof, does not include waves, signals, and/or other transitory and/or intangible communication media, per se.

In computing environment 500, I/O subsystem 540 may comprise a system, device, or apparatus generally operable to receive and/or transmit data to/from/within computing environment 500. I/O subsystem 540 may represent, for example, a variety of communication interfaces, graphics interfaces, video interfaces, user input interfaces, and/or peripheral interfaces. As shown, I/O subsystem 540 may further communicate with various I/O devices such as a touch panel and display adapter.

As illustrated in FIG. 5, computing environment 500 may include one or more power control modules 570 and one or more power supply units (PSUs) 580. In at least some embodiments, power control modules 570 may include power distribution circuitry. In at least some embodiments, power control module(s) 570 may control the allocation of power generated by one or more of the power supply units (PSUs) 580 to other resources in computing environment 500. In some embodiments, one or more of the power control modules 570 may include a management controller (MC).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A computer-implemented method for performing query compilation in a computing network providing database resources, the method comprising:
in response to determining that two ad hoc query batches with the same query text are to be compiled, generating one locking key for both ad hoc query batches;
allocating the locking key to a first of the ad hoc query batches;
in a subsequent cache lookup stage, in response to determining that no cache is found for the first ad hoc query batch, compiling a plan for the first ad hoc query batch;
inserting the compiled plan into a cache and releasing the locking key;
allocating the locking key to a second of the ad hoc query batches;
determining that the locking key for the second ad hoc query batch is the same as for the first ad hoc query batch and identifying the compiled plan in the cache;
bypassing plan compilation for the second of the ad hoc query batches;
using the compiled plan in the cache to process the second of the ad hoc query batches; and
releasing the locking key for the second of the ad hoc query batches.

Clause 2: The computer-implemented method of clause 1, wherein the database resources are SQL resources.

Clause 3: The computer-implemented method of clauses 1 or 2, wherein the method is performed in response to a failover from a primary instance providing the database resources to a secondary instance.

Clause 4: The computer-implemented method of any of clauses 1 through 3, wherein the ad hoc query batches are batches containing one or more of SELECT, INSERT, UPDATE, DELETE, or MERGE statements, and is not pre-prepared.

Clause 5: The computer-implemented method of any of clauses 1 through 4, wherein the locking key is generated using a hashing function.

Clause 6: The computer-implemented method of any of clauses 1 through 5, wherein a same locking key is generated when a same query batch is executed is from different sessions.

Clause 7: The computer-implemented method of any of clauses 1 through 6, wherein a same query batch being executed with different parameter values creates a same locking key.

Clause 8: A computing device comprising:
one or more processors;
a memory in communication with the one or more processors, the memory having computer-readable instructions stored thereupon which, when executed by the one or more processors, cause the computing device perform operations for performing query compilation in a computing network providing database resources, the operations comprising:
in response to determining that two ad hoc query batches with the same query text are to be compiled, generating one locking key for both ad hoc query batches;
allocating the locking key to a first of the ad hoc query batches;
in a subsequent cache lookup stage, in response to determining that no cache is found for the first ad hoc query batch, compiling a plan for the first ad hoc query batch;
inserting the compiled plan into a cache and releasing the locking key;
allocating the locking key to a second of the ad hoc query batches;
determining that the locking key for the second ad hoc query batch is the same as for the first ad hoc query batch and identifying the compiled plan in the cache;
bypassing plan compilation for the second of the ad hoc query batches;
using the compiled plan in the cache to process the second of the ad hoc query batches; and
releasing the locking key for the second of the ad hoc query batches.

Clause 9: The computing system of clause 8, wherein the database resources are SQL resources.

Clause 10: The computing system of any of clauses 8 and 9, wherein the operations are performed in response to a failover from a primary instance providing the database resources to a backup instance.

Clause 11: The computing system of any clauses 8-10, wherein the ad hoc query batches are batches containing one or more of SELECT, INSERT, UPDATE, DELETE, or MERGE statements, and is not pre-prepared.

Clause 12: The computing system of any clauses 8-11, wherein the locking key is generated using a hashing function.

Clause 13: The computing system of any clauses 8-12, wherein a same locking key is generated when a same query batch is executed is from different sessions.

Clause 14: The computing system of any clauses 8-13, wherein a same query batch being executed with different parameter values creates a same locking key.

Clause 15: A computer-readable storage medium comprising computer-readable instructions stored thereupon which, when executed by one or more processors of a computing device, cause the computing device perform operations for performing query compilation in a computing network providing database resources, the operations comprising:
in response to determining that two ad hoc query batches with the same query text are to be compiled, generating one locking key for both ad hoc query batches;
allocating the locking key to a first of the ad hoc query batches;
in a subsequent cache lookup stage, in response to determining that no cache is found for the first ad hoc query batch, compiling a plan for the first ad hoc query batch;
inserting the compiled plan into a cache and releasing the locking key;
allocating the locking key to a second of the ad hoc query batches;
determining that the locking key for the second ad hoc query batch is the same as for the first ad hoc query batch and identifying the compiled plan in the cache;
bypassing plan compilation for the second of the ad hoc query batches;
using the compiled plan in the cache to process the second of the ad hoc query batches; and
releasing the locking key for the second of the ad hoc query batches.

Clause 16: The computer-readable storage medium of clause 15, wherein the database resources are SQL resources.

Clause 17: The computer-readable storage medium of any of clauses 15 or 16, wherein the operations are performed in response to a failover from a primary instance providing the database resources to a backup instance.

Clause 18: The computer-readable storage medium of any of clauses 15-17, wherein the ad hoc query batches are batches containing one or more of SELECT, INSERT, UPDATE, DELETE, or MERGE statements, and is not pre-prepared.

Clause 19: The computer-readable storage medium of any of clauses 15-18, wherein the locking key is generated using a hashing function.

Clause 20: The computer-readable storage medium of any of clauses 15-19, wherein a same locking key is generated when a same query batch is executed is from different sessions.

What is claimed is:

1. A computer-implemented method for performing query compilation in a computing network providing database resources, the method comprising:
in response to determining that two ad hoc query batches with the same query text are to be compiled, generating one locking key for both ad hoc query batches;
allocating the locking key to a first of the ad hoc query batches;
in a subsequent cache lookup stage, in response to determining that no cache is found for the first ad hoc query batch, compiling a plan for the first ad hoc query batch;

inserting the compiled plan into a cache and releasing the locking key;

allocating the locking key to a second of the ad hoc query batches;

determining that the locking key for the second ad hoc query batch is the same as for the first ad hoc query batch and identifying the compiled plan in the cache;

bypassing plan compilation for the second of the ad hoc query batches;

using the compiled plan in the cache to process the second of the ad hoc query batches; and releasing the locking key for the second of the ad hoc query batches.

2. The computer-implemented method of claim 1, wherein the database resources are SQL resources.

3. The computer-implemented method of claim 1, wherein the method is performed in response to a failover from a primary instance providing the database resources to a secondary instance.

4. The computer-implemented method of claim 1, wherein the ad hoc query batches are batches containing one or more of SELECT, INSERT, UPDATE, DELETE, or MERGE statements, and is not pre-prepared.

5. The computer-implemented method of claim 1, wherein the locking key is generated using a hashing function.

6. The computer-implemented method of claim 1, wherein a same locking key is generated when a same query batch is executed is from different sessions.

7. The computer-implemented method of claim 1, wherein a same query batch being executed with different parameter values creates a same locking key.

8. A computing device comprising:
one or more processors;
a memory in communication with the one or more processors, the memory having computer-readable instructions stored thereupon which, when executed by the one or more processors, cause the computing device perform operations for performing query compilation in a computing network providing database resources, the operations comprising:

in response to determining that two ad hoc query batches with the same query text are to be compiled, generating one locking key for both ad hoc query batches;

allocating the locking key to a first of the ad hoc query batches;

in a subsequent cache lookup stage, in response to determining that no cache is found for the first ad hoc query batch, compiling a plan for the first ad hoc query batch;

inserting the compiled plan into a cache and releasing the locking key;

allocating the locking key to a second of the ad hoc query batches;

determining that the locking key for the second ad hoc query batch is the same as for the first ad hoc query batch and identifying the compiled plan in the cache;

bypassing plan compilation for the second of the ad hoc query batches;

using the compiled plan in the cache to process the second of the ad hoc query batches; and releasing the locking key for the second of the ad hoc query batches.

9. The computing device of claim 8, wherein the database resources are SQL resources.

10. The computing device of claim 8, wherein the operations are performed in response to a failover from a primary instance providing the database resources to a backup instance.

11. The computing device of claim 8, wherein the ad hoc query batches are batches containing one or more of SELECT, INSERT, UPDATE, DELETE, or MERGE statements, and is not pre-prepared.

12. The computing device of claim 8, wherein the locking key is generated using a hashing function.

13. The computing device of claim 8, wherein a same locking key is generated when a same query batch is executed is from different sessions.

14. The computing device of claim 8, wherein a same query batch being executed with different parameter values creates a same locking key.

15. A computer-readable storage medium comprising computer-readable instructions stored thereupon which, when executed by one or more processors of a computing device, cause the computing device perform operations for performing query compilation in a computing network providing database resources, the operations comprising:

in response to determining that two ad hoc query batches with the same query text are to be compiled, generating one locking key for both ad hoc query batches;

allocating the locking key to a first of the ad hoc query batches;

in a subsequent cache lookup stage, in response to determining that no cache is found for the first ad hoc query batch, compiling a plan for the first ad hoc query batch;

inserting the compiled plan into a cache and releasing the locking key;

allocating the locking key to a second of the ad hoc query batches;

determining that the locking key for the second ad hoc query batch is the same as for the first ad hoc query batch and identifying the compiled plan in the cache;

bypassing plan compilation for the second of the ad hoc query batches;

using the compiled plan in the cache to process the second of the ad hoc query batches; and releasing the locking key for the second of the ad hoc query batches.

16. The computer-readable storage medium of claim 15, wherein the database resources are SQL resources.

17. The computer-readable storage medium of claim 15, wherein the operations are performed in response to a failover from a primary instance providing the database resources to a backup instance.

18. The computer-readable storage medium of claim 15, wherein the ad hoc query batches are batches containing one or more of SELECT, INSERT, UPDATE, DELETE, or MERGE statements, and is not pre-prepared.

19. The computer-readable storage medium of claim 15, wherein the locking key is generated using a hashing function.

20. The computer-readable storage medium of claim 15, wherein a same locking key is generated when a same query batch is executed is from different sessions.

* * * * *